C. A. LIEB.
AUTOMOBILE TIRE.
APPLICATION FILED DEC. 23, 1908.
968,777.
Patented Aug. 30, 1910.
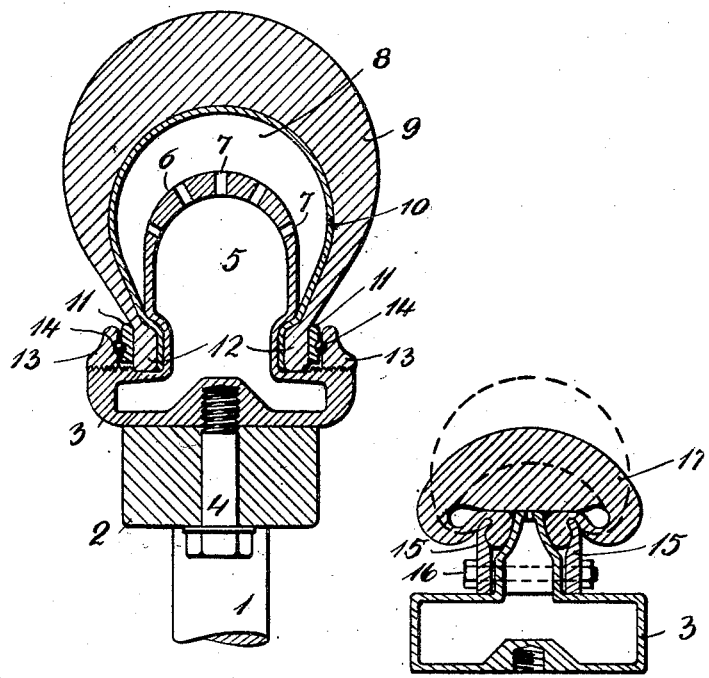
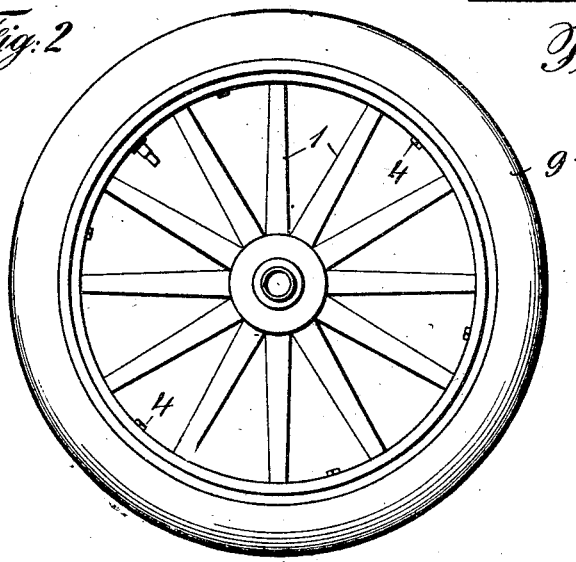
Witnesses:
Max B. A. Doring.
F. M. Dursbach.
Inventor
Charles A. Lieb
By his Attorney
Phillips Abbott.

UNITED STATES PATENT OFFICE.

CHARLES A. LIEB, OF NEW YORK, N. Y.

AUTOMOBILE-TIRE.

968,777.   Specification of Letters Patent.   Patented Aug. 30, 1910.

Application filed December 23, 1908. Serial No. 468,916.

*To all whom it may concern:*

Be it known that I, CHARLES A. LIEB, a citizen of the United States, and a resident of the borough of Manhattan, city, county, and State of New York, have invented new and useful Improvements in Automobile-Tires, of which the following is a specification, reference being had to the accompanying drawings, in which—

Figure 1 illustrates a sectional view of one form of my invention; Fig. 2 illustrates an elevation of that which is shown in Fig. 1, a wheel being shown complete; Fig. 3 illustrates a modified construction.

As is well known, the shoes of automobile and similar pneumatic tires are made up of layers of textile fabric cemented and firmly held together by rubber, the rubber being employed because of its elasticity, its ability to firmly grip hold of and bind the textile material together, its waterproof and air tight qualities and lastly, its tractive power. The textile fabric is employed to give the requisite strength. It is also well known that because of the heat of the roadbed in warm weather and that generated by the kneading of the rubber occasioned by the repeated and rapid compressions and expansions of the shoe when the machine is in operation, great heat is generated within the shoe which cannot be dissipated because of the insulating characteristics of rubber and consequently as the vehicle continues in operation, particularly if the motion be rapid, the heat quickly increases until a point is reached at which the rubber of the shoe and also of the inner tube becoming softened, loses its holding quality to a greater or less degree and consequently in time such a temperature develops that the strength of the tire and of the inner tube is materially reduced and "blow-outs" destroying both, result; also owing to the softening of the rubber, it more readily picks up puncturing materials from the roadbed and more readily permits the gouging out of pieces from the face of the tire when obstructions or roughnesses are encountered. This repeated heating, moreover, continues the vulcanization process which in time destroys the rubber.

In the attempt to overcome the above stated objections manufacturers have gradually increased the size of the shoes, larger and larger tires being used, so as to give large areas of contact between the textile fabric and the rubber cementitious material, and also to secure more cubic inches of air or gas inside the tire in the hope that "blow-outs", punctures, and other defects would be thereby avoided. This very greatly increases the first cost as well as the maintenance charges.

It is the purpose of my invention, therefore, to materially reduce the above stated objection and to accomplish this I provide a metallic air reservoir of relatively thin metal through the walls of which the heat of the contained air will be materially reduced by radiation since the metal employed will be a good conductor and also I may do away altogether with an inner tube, and owing to these structural features, I materially reduce the initial cost of the shoes, and what is more important, greatly reduce the cost of maintenance; also I so construct the parts that co-act with the shoe that in the event of reduction of the air or gas pressure from any cause, the tire will when collapsed, subside upon a suitable supporting surface so that in effect the tire will then become a solid one and may be run a considerable distance without injury either to the tire itself or to any part of the running gear.

My invention contemplates the construction of the tire upon an altogether new principle. Certain of the beneficial phases of the invention, however, may be employed in wheels and tires of known constructions.

Referring now to the drawings, 1 represents one of the spokes of an automobile wheel, 2 the felly, 3 a hollow metallic rim rigidly held to the felly by bolts 4, or in any suitable manner. The metallic rim 3 may be made of any suitable metal and in any suitable form to give it the requisite strength and lightness. It comprises a circumferential chamber 5, within which is a dome-like upper part 6, having perforations 7 through which the air contained in the rim can circulate into a chamber 8. 9 is the outer shoe made of fabric material and rubber, and I prefer to line it with a layer 10 of better quality rubber to prevent the escape of the compressed air or gas. The shoe 9 may be made of the shape shown and is clamped to the metallic rim 3 by means of annular ring plates 11, 11, which are forcibly compressed against the lower edges 12, 12, of the shoe by means of annular rings 13, which may be threaded as shown to the metallic rim 3. 14 are a series of balls constituting an antifriction bearing between the annular plates 11 and the threaded rings 13, so that a suitable spanner wrench or equivalent implement being used, the annular plates 11 may be moved inwardly with great force, so as to squeeze the lower edges 12 of the shoe into air-tight contact with the metallic rim 3.

The operation of the construction as thus far described is as follows: The threaded rings 13 are in the first instance unscrewed from the rim 3, the ball or roller bearings 14 and the annular plates 11 coming away with them. These parts being removed, the shoe is placed in position as illustrated in Fig. 1. Thereupon the plates 11 and the threaded rings 13 with the antifriction balls in place, are again applied to the rim 3 and screwed up tight, so that the lower edges 12 of the shoe are so rigidly clamped between the annular plates 11 and the rim 3 as to secure air-tight joints. Thereupon air is pumped into the air chamber 5 within the rim 3 through a suitable tube provided with the usual valve, as is well understood. The compressed air passes through the holes 7 into the space 8 and inflates the shoe which is then in condition for use in the usual way.

It will be observed that I accomplish the following important advantages: first, no inner tube is required; second, to assure air-tightness in the shoe I employ the lining 10 which will give the same effect as an inner tube at much less cost than that of inner tubes as now constructed; third, I secure many more cubic inches of air or gas than in the ordinary inner tube, with much less amount of rubber; fourth, large portions of the surface of the tubular metallic rim being exposed to the atmosphere and in the most advantageous position to induce and facilitate radiation of the heat, the temperature of the air within the shoe and rim is materially reduced; fifth, the compression of the shoe when in operation will occasion continual circulation of the air through the openings 7 into the interior of the rim 3, thus continually circulating the cooled air throughout the entire interior of the shoe and hollow rim; sixth, if there should be a puncture, the shoe cannot entirely collapse which is likely to destroy it because of the sharp folding of its sides over the edges of the rim, in other words, "rim cutting", so called; on the contrary, it can subside or collapse only so far as will bring it in contact with the dome of the part 3 which being seamless and tubular in construction is sufficiently strong to support the weight and resist the side thrusts arising on curves, thus in effect the shoe when collapsed will simply be transformed from a pneumatic tire into a solid tire, and the car can be run with care for an indefinite distance without injury to the shoe or any part of the structure.

In order that the advantage last referred to may be more fully realized, I sometimes modify the construction of the tubular rim or air reservoir 3 as shown in Fig. 3, in which the rim is shown of a somewhat different shape, but is substantially the same in operation. In this construction I confine the shoe to the rim by annular plates 15, 15, which are clamped together with cross bolts 16, and I reduce the height and area of the outer part of the hollow rim as shown, so that said outer part is about even with the upper surface of the edges of the shoe when collapsed as indicated by the numeral 17. In this way, should a puncture occur, the shoe will change its shape from that which it is when inflated, as shown in dotted lines, to that which it assumes when collapsed as shown in full lines. It will be seen that when the parts are made as shown in Fig. 3, good and substantial support is afforded for the collapsed shoe, so that it may be run with safety even in its collapsed condition.

It is obvious that modifications may be made in the details of construction of the parts without departing from the essentials of the invention which are that instead of the usual inner tube, there shall be an immovable, hollow or tubular rim made of radiating material exposed to the exterior atmosphere. It is immaterial whether this hollow rim be constructed and arranged exactly as in the two examples illustrated, or in some other way except that it is essential that it shall be seamless, in other words, tubular in construction, not having any cracks or seams in it, because otherwise it will not have the requisite strength to sustain the shoe when collapsed and to resist the crushing and lateral strains then brought upon it.

Obviously my invention is applicable to the so-called removable rim tires as well as to those in which the rim remains permanently on the wheel.

I claim:

1. An automobile or similar wheel, comprising a perforated, seamless, hollow, metallic rim supported upon the felly of the wheel and having a part which projects radially beyond the other parts of the rim and which is adapted to act as a rigid support for the shoe when the latter is partly collapsed, a hollow, flexible, pneumatic shoe, and means to make the shoe air-tight.

2. In an automobile or similar wheel, a seamless, perforated, hollow, metallic rim, a part of which projects radially and is adapted to act as a rigid support for the shoe when the latter is partly collapsed, other parts of said rim being in direct contact with the external atmosphere for reducing the temperature of the air therein, and a hollow, flexible, pneumatic shoe.

3. In an automobile or similar wheel, a seamless, hollow, perforated, metallic rim which acts as a reinforce for the felly of the wheel, clamping devices whereby a hollow shoe may be hermetically secured thereto, and a hollow, flexible, pneumatic shoe.

4. In an automobile or similar wheel, a seamless, hollow, metallic rim having a part which projects radially beyond any other part of the rim, whereby it is adapted to act as a rigid support for the shoe when the latter is collapsed, said radially projecting part being provided with perforations, means whereby a hollow, pneumatic shoe may be hermetically clamped to said rim, a hollow, flexible, pneumatic shoe, and means whereby air may be forced into said rim.

5. In an automobile or similar wheel, a seamless, hollow, metallic rim, the peripheral surface whereof is perforated and projects radially beyond any other part of the rim, whereby it is adapted to act as a rigid support for the shoe when the latter is partly collapsed, and having also laterally presented clamping surfaces and clamping plates to co-act with said surfaces, a hollow, flexible, pneumatic shoe, and means to force the clamping plates toward the clamping surfaces.

6. In an automobile or similar wheel, a rigid, seamless, hollow, metallic rim and a hollow, flexible, pneumatic shoe, means to hermetically attach the shoe to the rim, the outer portions of the latter being so formed as to constitute a rigid support for the former when partly collapsed.

7. In an automobile or similar wheel, a seamless, hollow, metallic rim adapted to contain compressed air, a part of which projects radially within the shoe and is adapted to act as a rigid support for the shoe when the latter is partly collapsed, other parts whereof are outside the shoe and in direct contact with the external atmosphere, and a hollow, flexible, pneumatic shoe.

In testimony whereof I have signed my name to this specification in the presence of two subscribing witnesses.

CHARLES A. LIEB.

Witnesses:
 PHILLIPS ABBOTT,
 F. M. DOUSBACH.